Patented Nov. 2, 1943

2,333,552

UNITED STATES PATENT OFFICE 2,333,552

PROCESS OF MANUFACTURING DIPHENYL-SULPHONE DERIVATIVES AND PRODUCT OBTAINABLE BY SUCH PROCESS

Paul Pöhls and Fritz Mietzsch, Wuppertal-Elberfeld, and Alfred Rohm, Leverkusen-I. G.-Werk, Germany, assignors to Winthrop Chemical Company, Inc., New York, N. Y., a corporation of New York No Drawing. Application September 13, 1940, Serial No. 356,653. In Germany September 4, 1939

7 Claims. (Cl. 260—397.6)

This invention relates to a process of manufacturing diphenylsulphone derivatives and to certain products obtainable by such process.

Application for Letters Patent Ser. No. 274,228, filed May 17, 1939, now U. S. Patent 2,297,024, refers to diphenylsulphone derivatives which are substituted in the 4- and 4'-position by urea groups the one nitrogen atom of which is connected with an organic radical containing a water-solubilizing group. The said compounds are obtainable, for instance, by reacting a diphenylsulphone-4,4'-diurethane with an organic compound containing apart from an amino group at least one water-solubilizing group or vice-versa by reacting the urethane derivatives of an organic compound containing a water-solubilizing group with 4,4'-diaminodiphenylsulphone.

U. S. application for Letters Patent Ser. No. 304,177, filed November 13, 1939, now U. S. Patent 2,288,422, and U. S. Patent 2,226,835 describe particularly favorable processes for the manufacture of unsymmetrical urea compounds by reacting organic amines with urethane compounds while using the urethane in the form of an aryl ester, i. e. in the form of carbamic acid arylesters.

In accordance with the present invention, the said process of the copending application Ser. No. 304,177 and U. S. P. 2,226,835 may also advantageously be used in the manufacture of the urea compounds of the kind specified in application Ser. No. 274,228. Accordingly, diphenylsulphone urea derivatives are obtained by reacting a compound of the formula

with a compound of the formula

in which formulae R stands for an organic radical containing a water-solubilizing group selected from the group consisting of the radicals of aliphatic polyhydroxy compounds derived from sugars and of aliphatic, aromatic and heterocyclic carboxylic, sulphonic and sulphinic acids including those radicals which contain as an interrupting group one of the carbonamide and urea groups, and the substituents X and Y mutually stand for hydrogen and the group -COO-aryl. Thus, for instance, diphenylsulphone-4,4'-bis-(carbamic acid arylesters) are reacted with an organic compound containing apart from an amino group at least one water-solubilizing group such as carboxylic, sulphonic and sulphinic acid groups or a plurality of aliphatically bound hydroxyl groups as are contained in sugars. As such organic amino compounds containing a water-solubilizing group, for instance, aminoalkyl- or aminoarylalkyl-carboxylic acids such as glycocoll and aminophenyl acetic acids, aminoalkyl sulphonic acids such as taurine, aminoaryl carboxylic-, sulphonic- or sulphinic acids such as the aminobenzene carboxylic acids, aminobenzene sulphonic acids, aminonaphthalene sulphonic acids, aminobenzene sulphinic acids, aminoquinoline sulphonic acids and nuclear substitution products of these compounds and amino derivatives of polyvalent alcohols may be used. Otherwise, carbamic acid arylesters, the nitrogen atom of which is substituted by an organic radical containing a water-solubilizing group of the kind specified above, can be reacted with 4,4'-diaminodiphenylsulphone. The carbamic acid arylesters may contain as aryl radicals the radical of the various phenols and naphthols. The reaction advantageously is performed with heating and in the presence of a solvent or diluent such as water or organic solvents which are miscible with water, for instance acetone, methyl-ethyl ketone, diethyl ketone, dioxane, tetrahydrofurane and the like.

The invention is furthermore illustrated by the following examples without, however, being restricted thereto:

*Example 1*

24.8 grams of 4,4'-diaminodiphenylsulphone are suspended in 150 ccms. of dioxane. 25 grams of dimethylaniline are added thereto and 32 grams of chloroformic acid phenylester are slowly dropped in while stirring. The temperature rises to almost 60° C. and the 4,4'-diaminodiphenylsulphone dissolves. After heating for half an hour on the waterbath 52.6 grams of 2-napthylamine-6-sulphonic acid, dissolved in 400 ccms. of 2% sodium hydroxide solution, are added to the mixture containing the diphenylsulphone-4,4'-carbamic acid phenylester formed. The solution is standardized as usual to a pH of 7.5. After 5 hours' boiling while stirring the diphenylsulphone-4,4'-carbamic acid phenylester which has separated dissolves. The clear solution is made slightly alkaline and the dimethylaniline is blown off with steam. The solution is then acidified with glacial acetic acid and the phenol is removed with steam. The remaining solution is added to 1000 ccms. of a 35% sodium chloride solution while stirring and the bis-[N-(6'-sodium-naphthalenesulphonate-2')-carbamido-N-phenyl-4]-sulphone separated is sucked off and dried in the exsiccator. It has the following formula:

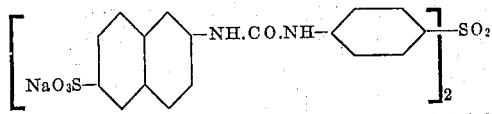

When reacting 2-naphthylamine-5-sulphonic acid, 2-naphthylamine-8-sulphonic acid and 2-naphthylamine-7-sulphonic acid with diphenylsulphone-4,4'-di-(carbamic acid phenylester) in the same manner, the corresponding water-soluble urea compounds are obtained.

Example 2

24.8 grams of 4,4'-diaminodiphenylsulphone are suspended in 150 ccms. of dioxane. 25 grams of dimethylaniline are added and 32 grams of chloroformic acid phenylester are slowly dropped in while stirring. After heating for half an hour on the waterbath, 66 grams of the mono-sodium salt of naphthylamine-3,6-disulphonic acid, dissolved in 400 ccms. of a 2% sodium hydroxide solution, are added. Then the solution is standardized to a pH of 7.5. After 15 hours' boiling and stirring the diphenylsulphone-4,4'-carbamic acid phenylester precipitated dissolves. The clear solution obtained is freed from dimethylaniline and phenol as described in Example 1 and concentrated under reduced pressure. Then, the bis-[N'-(3',6'-sodium-naphthalene-disulphonate-2')-carbamido-N-phenyl-4-]-sulphone being soluble in water crystallizes in the cold. It has the following formula:

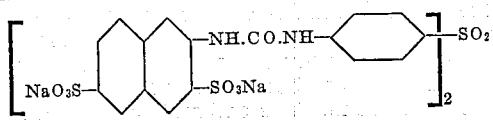

By reacting sodium-1-naphthylamine-4-sulphonate and sodium-sulphanilate with diphenylsulphone-4,4'-dicarbamic acid phenylester in the same manner, the corresponding urea compounds are obtained.

Example 3

48.8 grams of diphenylsulphone-4,4'-bis-carbamic acid phenylester are suspended in 200 ccms. of dioxane. A solution of 36.2 grams of 1-aminobenzene-3,5-dicarboxylic acid and 16 grams of sodium hydroxide in 200 ccms. of water is added. This mixture is standardized to a pH of 7.5 by adding primary sodium phosphate and boiled under reflux while stirring. After 2 hours' stirring the diphenylsulphone-4,4'-bis-carbamic acid phenylester has dissolved. A test portion of the solution gives no precipitate when water is added. The solution is filtered while hot with animal charcoal. The filtrate is acidified with dilute hydrochloric acid after cooling and the bis-[N'-(3',5'-dicarboxy-phenyl)-carbamido-N-phenyl-4]-sulphone is sucked off, washed with water and dried at 100° C. It melts at 240° C. with decomposition. The product has the following formula:

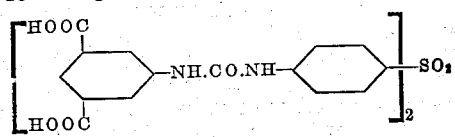

The diphenylsulphone-4,4'-bis-carbamic acid phenylester melting at 251° C. (with decomposition) has been obtained by 4 hours' boiling of a mixture of 248 grams of 4,4'-diaminodiphenylsulphone in 1000 ccms. of acetone, 175 grams of pyridine and 314 grams of chloroformic acid phenyl ester. The diphenylsulphone-4,4'-bis-carbamic acid phenylester separates from the mixture.

Example 4

18 grams of N-methylglucamine are dissolved in 200 ccms. of water. 22.6 grams of diphenylsulphone-4,4'-bis-carbamic acid phenylester and 150 ccms. of dioxane are added and the mixture is boiled under reflux while stirring. After boiling for one and a half hours the diphenylsulphone-4,4'-bis-carboxylic acid phenylester has dissolved. The solution is filtered with animal charcoal while hot and the filtrate is evaporated under reduced pressure. The glass-like solidifying residue is dissolved in methanol and the solution is boiled for a short time with animal charcoal, filtered and evaporated under reduced pressure. The bis-[N'-(1',2',3',4',5'-pentahydroxy-hexyl-6'-)-N'-methyl-carbamido-N-phenyl-4]-sulphone is soluble in water. It has the following formula:

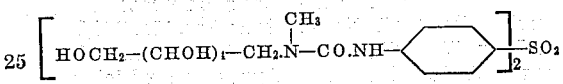

Example 5

48.8 grams of diphenylsulphone-4,4'-bis-carbamic acid phenylester and 150 ccms. of dioxane are added to a solution of 31.4 grams of 4-aminobenzenesulphinic acid in a solution of 8 grams of sodium hydroxide in 200 ccms. of water. The mixture is standardized with primary sodium phosphate to a pH of 7.5 and boiled under reflux while stirring. After 5 hours' boiling the diphenylsulphone-4,4'-bis-(carbamic acid phenylester) is dissolved. The solution is acidified with dilute hydrochloric acid after filtering with animal charcoal in the cold. The bis-[N'-(phenyl-4'-sulphinic acid)-carbamido-N-phenyl-4]-sulphone separated is sucked off, washed with water and dried at 100° C. It is soluble in dilute sodium carbonate solution. The product has the following formula:

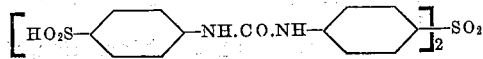

Example 6

15 grams of aminoacetic acid are dissolved in 200 ccms. of water and mixed with 8 grams of sodium hydroxide. The solution is standardized to a pH of 7.5 by adding primary sodium phosphate. 48.8 grams of diphenylsulphone-4,4'-bis-carbamic acid phenylester and 150 ccms. of dioxane are added and the mixture is boiled for 4 hours under reflux. The diphenylsulphone-4,4'-bis-carbamic acid phenylester has then dissolved. The solution is filtered with animal charcoal while hot and the filtrate is acidified with dilute hydrochloric acid. The bis-[N'-carboxymethyl-carbamido-N-phenyl-4]-sulphone precipitates only at the concentration of the aqueous solution under reduced pressure as a quickly crystallizing oil. It is sucked off, washed with methanol and dried at 100° C. It is readily soluble in dilute sodium carbonate solution. The product has the following formula:

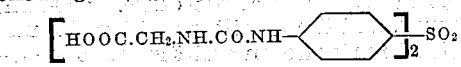

Example 7

22.3 grams of 2-naphthylamine-6-sulphonic acid are dissolved in a solution of 4 grams of sodium hydroxide in 400 ccms. of water while heating. Upon cooling to room temperature the sodium-2-naphthylamine-6-sulphonate in part crystallizes. The mixture is standardized by adding primary sodium phosphate to a pH of 7.0. 16.8 grams of chloroformic acid phenylester are dropped thereto while stirring at a temperature of 25° C. The separating hydrogen chloride splitting off is neutralized by dilute sodium carbonate solution so that the mixture remains always weakly acid. The carbamic acid phenylester of the sodium-2-amino-naphthalene-6-sulphonate in part precipitates. 12.4 grams of 4,4'-diaminodiphenylsulphone and 200 ccms. of dioxane are added. The mixture is boiled under reflux while stirring, until the 4,4'-diaminodiphenylsulphone has disappeared after about 5 hours. The clear solution is filtered with animal charcoal while hot and the filtrate is added after cooling to a 35% sodium chloride solution while stirring. Thereupon, the bis-[N'-(6'-sodium-naphthalenesulphonate-2')-carbamido-N-phenyl-4]-sulphone precipitates. It is sucked off and dried. The product has the following formula:

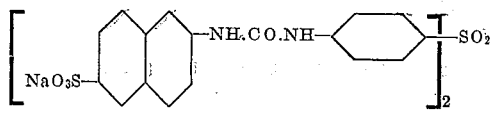

*Example 8*

45.5 grams of the mono-sodium salt of the 2-(3'-aminobenzoylamino)-naphthalene-3,6-disulphonic acid are dissolved in 300 ccms. of water and 4 grams of sodium hydroxide; 25 grams of diphenylsulphone-4,4'-bis-carbamic acid phenylester and 200 ccms. of dioxane are added. The mixture is standardized to a pH of 7.5 by adding primary sodium phosphate and boiled under reflux while stirring. After 6 hours' boiling a test portion of this mixture gives no precipitate when diluted with water. The clear solution is filtered with animal charcoal while hot. The filtrate is added to a 35% sodium chloride solution after cooling while stirring. Thereupon, the tetra-sodium salt of the sulphone-bis-{2-[3'-(4''-phenylcarbamido)-benzamino]-naphthalenedisulphonic acid-(3,6)} precipitates. It is sucked off and dried at 100° C. The product has the following formula:

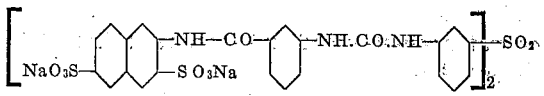

The mono-sodium salt of the 2-(3'-aminobenzoylamino)-naphthalene-3,6-disulphonic acid used as starting material is obtained as follows:

36.5 grams of the mono-sodium salt of the 2'-naphthylamine-3,6-disulphonic acid are dissolved in 250 ccms. of water and 4 grams of sodium hydroxide, 30 grams of sodium acetate are added and 36.5 grams of m-nitrobenzoylchloride are introduced at a temperature of 30–35° C. After a short time the sodium salt of the 2-(3'-nitrobenzoylamino)-naphthalene-3,6-disulphonic acid crystallizes. It is sucked off, dissolved in hot water and this solution is dropped into a boiling mixture of 500 grams of iron, 1000 ccms. of water and 10 ccms. of glacial acetic acid while stirring. After 5 hours' boiling the reaction solution is made alkaline with potassium carbonate, filtered while hot with animal charcoal and the filtrate is mixed after cooling with a large quantity of hydrochloric acid. Thereupon the mono-sodium salt of the 2-(3'-amino-benzoylamino)-naphthalene-3,6-disulfonic acid precipitates in crystals.

In the same manner, the 2-(4'-aminobenzoylamino)-naphthalene-3,6-disulfonic acid is produced and reacted with diphenylsulphone-4,4'-bis-carbamic acid phenylester to the tetra-sodium salt of the sulphone-bis-{2-[4'-(4'''-phenylcarbamido)-benzamino]-naphthalene-disulphonic acid-(3,6)}.

*Example 9*

35.7 grams of $N^1$-(2-naphthyl-6-sulphonic acid)-$N^2$-(m-amino-phenyl)-urea are dissolved in 300 ccms. of water and 4 grams of sodium hydroxide. 25 grams of diphenylsulphone-4,4'-bis-carbamic acid phenylester and 200 ccms. of dioxane are added. The mixture is standardized to a pH of 7.5 by adding primary sodium phosphate and boiled under reflux while stirring. After 3 hours' boiling the diphenylsulphone-4,4'-bis-carbamic acid phenylester is dissolved. The solution is filtered while hot with animal charcoal and the filtrate is concentrated under reduced pressure. After cooling the concentrate is added to a 35% sodium chloride solution while stirring. The di-sodium salt of the sulphone-bis-{2-[3''-(4'''-phenyl-carbamino)-phenyl-carbamino]-naphthalenesulphonic acid-(6)} which has precipitated is sucked off, pressed off and dried at 100° C. It is easily soluble in cold water. The product has the following formula:

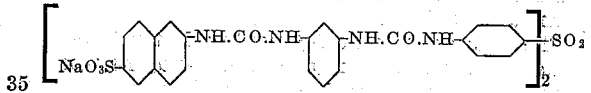

The $N^1$-(2-naphthyl-6-sulphonic acid)-$N^2$-(m-aminophenyl)urea employed as starting material is produced as follows:

55.2 grams of m-nitraniline are dissolved in 300 ccms. of acetone, 35 grams of pyridine are added and 62.8 grams of chloroformic acid phenylester are dropped thereto while stirring and boiling under reflux. After 3 hours' boiling the acetone solution is poured into water while stirring. The m-nitrophenyl-carbamic acid phenylester precipitates in crystals. It is sucked off, washed with water and dried at 100° C. It melts above 260° C.

52.6 grams of 2-naphthylamine-6-sulphonic acid are dissolved in 600 ccms. of water and 8 grams of sodium hydroxide while heating. 51.6 grams of m-nitrophenylcarbamic acid phenylester and 300 ccms. of dioxane are added. The mixture is standardized to a pH of 7.5 by adding primary sodium phosphate and boiled under reflux while stirring. After 4 hours' boiling the carbamic acid phenylester has dissolved. The clear hot solution is dropped into a boiling mixture of 500 grams of iron, 1000 ccms. of water and 10 ccms. of glacial acetic acid while stirring. After 4 hours' boiling the reaction mixture is made alkaline with potassium carbonate and filtered with animal charcoal while hot. The filtrate is acidified with dilute hydrochloric acid after cooling and the $N^1$-(2-naphthyl-6-sulphonic acid)-$N^2$-(m-aminophenyl)-urea which has precipitated in crystals is sucked off and dried at 100° C.

The $N^1$-(2-naphthyl-6-sulphonic acid)-$N^2$-(p-aminophenyl)-urea is produced in the same manner and reacted with diphenylsulphone-4,4'-bis-carbamic acid phenylester to the di-sodium salt of the sulphone-bis-{2-[4'-(4''-phenyl-carbamino)-phenylcarbamino]-naphthalene-sulphonic acid-(6)}.

Example 10

26.5 grams of 2-naphthylamine-6-sulphonic acid are dissolved in 300 ccms. of water with the addition of 4 grams of sodium hydroxide while heating. 29.4 grams of diphenylsulphone-4,4'-bis-(carbamic acid-β-naphthylester) and 150 ccms. of dioxane are added. The mixture is standardized to a pH of 7.5 by adding primary sodium phosphate and boiled under reflux while stirring. After 30 hours' stirring and boiling the bis-(carbamic-acid-β-naphthylester) has dissolved. The reaction solution is concentrated under reduced pressure and filtered from the precipitated β-naphthol while hot. The bis-[N'-(6' - sodium - naphthalenesulphonate - 2') - carbamido-N-phenyl-4]-sulphone already mentioned in Example 1 crystallizes from the filtrate upon cooling. It has the following formula:

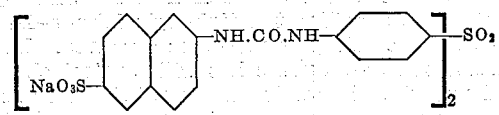

The diphenylsulphone-4,4'-bis-(carbamic acid-β-naphthylester) used as starting material is obtained by 2 hours' boiling of a mixture of 24.8 grams of 4,4'-diamino-diphenylsulphone in 300 ccms. of acetone, 18 grams of pyridine and 41.4 grams of chloroformic acid-β-naphthylester. It crystallizes already while hot and is sucked off in the cold, washed with water and dried at 100° C. It melts at 249° C.

The chloroformic acid-β-naphthylester is obtained by reacting phosgene upon β-naphthol in the presence of dimethylaniline in a benzene solution. It boils at 258° C. under 15 mms. pressure.

We claim:

1. The process which comprises reacting a compound of the formula R—NH—X with a compound of the formula

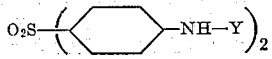

in which R represents a member of the group consisting of carboxy alkyl, carboxy aryl, sulphonic alkyl, sulphonic aryl, sulphinic alkyl and sulphinic aryl; X represents hydrogen and Y represents —COO—aryl.

2. The process which comprises reacting a compound of the formula R—NH—X with a compound of the formula

in which R represents a sulphonic aryl, X represents hydrogen and Y represents —COO—aryl.

3. The process which comprises reacting a compound of the formula R—NH—X with a compound of the formula

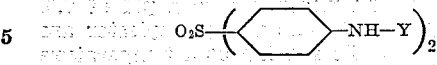

in which R represents a member of the group consisting of carboxy alkyl, carboxy aryl, sulphonic alkyl, sulphonic aryl, sulphinic alkyl and sulphinic aryl; X represents hydrogen and Y represents —COO—phenyl.

4. The process which comprises reacting a compound of the formula R—NH—X with a compound of the formula

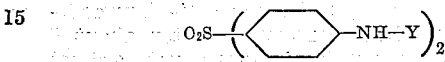

in which R represents a sulphonic naphthyl, X represents hydrogen and Y represents —COO—aryl.

5. A compound of the formula

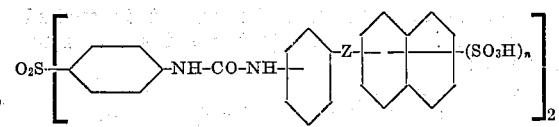

wherein Z stands for one of the groups

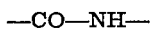

—CO—NH— and —NH—CO—NH— and n stands for one of the numbers 1 and 2, and its alkali and alkaline earth metal salts, which are soluble in water with neutral reaction.

6. A compound of the formula

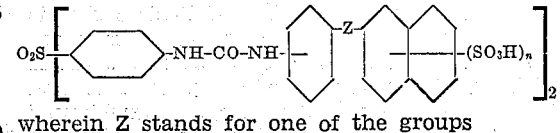

wherein Z stands for one of the groups

—CO—NH— and —NH—CO—NH and n stands for one of the numbers 1 and 2, and its alkali and alkaline earth metal salts, which are soluble in water with neutral reaction.

7. A compound having the formula

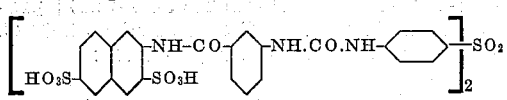

and water soluble alkali and alkaline earth metal salts thereof.

PAUL PÖHLS.
FRITZ MIETZSCH.
ALFRED ROHM.